(12) United States Patent
Hori et al.

(10) Patent No.: US 11,688,361 B2
(45) Date of Patent: Jun. 27, 2023

(54) QUANTIFYING PERFORMANCE OF A DISPLAY DEVICE

(71) Applicant: Apple Inc., Cupertino, CA (US)

(72) Inventors: Bjorn S. Hori, Albany, CA (US); Pranav Sodhani, Cupertino, CA (US); Krasimir D. Kolarov, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/313,686

(22) Filed: May 6, 2021

(65) Prior Publication Data
US 2021/0398503 A1 Dec. 23, 2021

Related U.S. Application Data

(60) Provisional application No. 63/041,700, filed on Jun. 19, 2020.

(51) Int. Cl.
*G09G 5/00* (2006.01)
*G01J 3/50* (2006.01)
*G09G 3/20* (2006.01)

(52) U.S. Cl.
CPC ............ *G09G 5/003* (2013.01); *G01J 3/506* (2013.01); *G09G 3/2003* (2013.01); *G09G 2320/04* (2013.01); *G09G 2320/0693* (2013.01)

(58) Field of Classification Search
None
See application file for complete search history.

(56) References Cited

U.S. PATENT DOCUMENTS

2020/0126509 A1* 4/2020 Nasiopoulos ............ G09G 5/02
2021/0152801 A1* 5/2021 Wang ........................ H04N 9/68

OTHER PUBLICATIONS

[No Author Listed], "High Dynamic Range Electro-Optical Transfer Function of Mastering Reference Displays," SMPTE Standard, SMPTE ST 2084:2014, Aug. 16, 2014, 14 pages.
[No Author Listed], "Recommendation ITU-R BT.1886, Reference electro-optical transfer function for flat panel displays used in HDTV studio production," ITU-R Radio communication Sector of ITU, Apr. 6, 2011, 7 pages.

(Continued)

*Primary Examiner* — Andre L Matthews
(74) *Attorney, Agent, or Firm* — Fish & Richardson P.C.

(57) ABSTRACT

In an example method, one or more processing devices receive encoded image data, and cause visual content to be presented on a display device according to the encoded image data. Further, the one or more processing devices receive measurement data regarding the visual content presented on the display device, and determine, based on the measurement data, one or more first perceptual quantizer (PQ) codes corresponding to the visual content presented on the display device. Further, the one or more processing devices determine, based on the encoded image data, one or more second PQ codes, and determine one or more metrics indicative of a performance characteristic the display device based on the first PQ codes and the second PQ codes. The one or more processing devices store a data item including the one or more metrics.

24 Claims, 12 Drawing Sheets

(56) References Cited

OTHER PUBLICATIONS

[No Author Listed], "Recommendation ITU-R BT.2100-2, Image parameter values for high dynamic range television for use in production and international program exchange," ITU-R Radio communication Sector of ITU, Jul. 2018, 16 pages.

[No Author Listed], "The present state of ultra-high definition television," Report ITU-R BT.2246-5, International telecommunication Union, ITU-R Radio communication sector of ITU, Jul. 2015, 92 pages.

diversifiedvideosoultions.com [online], "DVS UHD HDR-10," DVS, Internet archive: Wayback Machine URL <https://web.archive.org/web/20190407035727/https://www.diversifiedvideosolutions.com/dvs_uhdhdr-10.html>, retrieved on Sep. 15, 2021, <https://www.diversifiedvideosolutions.com/dvs_uhdhdr-10.html>, 8 pages.

[No Author Listed], "D-Cinema Quality—Reference Projector and Environment," SMPTE Recommended Practice, 431-2:2011, Apr. 6, 2011, 14 pages.

[No Author Listed], "Digital Source Processing—Color Processing for D-Cinema," Digital Cinema Initiatives (DCI) digital cinema SMPTE Engineering Guide (EG), SMPTE Engineering Guide (EG) 432-1, Nov. 10, 2010, 82 pages.

[No Author Listed], "Recommendation ITU-R BT.2020-2, Parameter values for ultra-high definition television systems for production and international programme exchange," ITU-R Radio communication Sector of ITU, Oct. 2015, 8 pages.

\* cited by examiner

QUANTIFYING PERFORMANCE OF A DISPLAY DEVICE

CLAIM OF PRIORITY

This application claims priority to U.S. Provisional Application No. 63/041,700, filed on Jun. 19, 2020, the entire contents of which are incorporated herein by reference.

TECHNICAL FIELD

This disclosure relates generally to display devices, and more particularly to measuring and quantifying the performance of a display device.

BACKGROUND

A display device can present visual content to one or more users. In some implementations, a display device can present visual content according to one or more specified colors and/or according to a specified luminance.

SUMMARY

In an aspect, a method includes receiving, by one or more processing devices, encoded image data; causing, by the one or more processing devices, visual content to be presented on a display device according to the encoded image data; receiving, by the one or more processing devices, measurement data regarding the visual content presented on the display device; determining, by the one or more processing devices based on the measurement data, one or more first perceptual quantizer (PQ) codes corresponding to the visual content presented on the display device; determining, by the one or more processing devices based on the encoded image data, one or more second PQ codes; determining, by the one or more processing devices, one or more metrics indicative of a performance characteristic the display device based on the one or more first PQ codes and the one or more second PQ codes; and storing, by the one or more processing devices, a data item including the one or more metrics.

Implementations of this aspect can include one or more of the following features.

In some implementations, determining each of the one or more of the metrics can include determining a difference between one of the first PQ codes and a corresponding one of the second PQ codes.

In some implementations, determining the one or more metrics can include determining a plurality of metrics.

In some implementations, each of the metrics can be associated with a respective color and a respective luminance value.

In some implementations, each of the colors can be selected from the group: red, green, blue, cyan, magenta, and yellow.

In some implementations, each of the colors can be gray.

In some implementations, the one or more metrics can be indicative of a color accuracy of the display device.

In some implementations, the one or more metrics can be indicative of a luminance accuracy of the display device.

In some implementations, the encoded image data can include the one or more second PQ codes.

In some implementations, the one or more second PQ codes can be determined based on a transfer function having at least a portion of the encoded image data as an input.

In some implementations, the one or more first PQ codes can be determined based on a transfer function having at least a portion of the measurement data as an input.

In some implementations, the measurement data can include one or more luminance values with respect to one or more wavelengths of light.

In some implementations, the measurement can be is generated using at least one of a spectroradiometer or a colorimeter.

In some implementations, the data item can include at least one of a data table, an array, a structure, a list, a dictionary, or a graph.

In some implementations, the method can further include determining one or more threshold values; comparing the one or more metrics to the one or more threshold values; and generating one or more notifications to a user based on the comparison.

In some implementations, the method can further include causing a graphical user interface (GUI) to be presented to a user, the GUI including a visual representation of the one or more metrics.

In some implementations, the visual representation can include a graph including at least some of the one more metrics.

In some implementations, the visual representation can include a plurality of graphs including at least some of the one more metrics.

In some implementations, the method can further include determining one or more modifications to an operation of the display device based the one or more metrics.

In some implementations, the one or more modifications can include a modification to a color calibration of the display device.

In some implementations, the one or more first PQ codes can have a first bit depth, and the one or more second PQ codes can have a second bit depth that is different from the first bit depth.

In some implementations, the one or more first PQ codes can have a first bit depth, the one or more second PQ codes can have a second bit depth, and the first bit depth can be equal to the second bit depth.

In some implementations, the one or more first PQ codes can be expressed as one or more floating point values.

Other implementations are directed to systems, devices, and non-transitory, computer-readable media having instructions stored thereon, that when executed by one or more processors, cause the one or more processors to perform operations described herein.

The details of one or more embodiments are set forth in the accompanying drawings and the description below. Other features and advantages will be apparent from the description and drawings, and from the claims.

DETAILED DESCRIPTION

This disclosure describes techniques for measuring and quantifying the performance of a display device (e.g., a computer monitor, television, mobile device display, projection system, or any other device that presents information visually to a user).

In some implementations, the techniques described herein can be used to characterize the accuracy by which a display device presents colors specified by source material. For example, these techniques can be used to determine a deviation between the colors specified by the source material and the colors that are actually presented by the display device to a user. In some implementations, the techniques described herein can be used to characterize the accuracy by which a display device displays visual content according to a particular luminance specified by source material. For instance, these techniques can be used to determine a deviation between the luminance specified by the source material and the luminance that is actually produced by the display device.

In some implementations, one or more of the techniques described herein can be used to calculate a metric ΔPQ that indicates the difference between a Perceptual Quantizer (PQ) code corresponding to the visual content that is actually presented by the display device and a corresponding PQ code specified in the source material (e.g., indicating that visual content should be displayed according to a particular luminance).

The techniques described herein can provide specific technical benefits. For example, the techniques described herein can be used to determine how accurately a display device is reproducing source material, and identify aspects of the display device that may be modified to improve the accuracy (e.g., by changing a color calibration of the display device). This can be beneficial, for example, in enabling users to improve the performance of their display devices. As another example, the techniques described herein can be used to determine the relationship between how visual content is encoded in source material, and how that visual content is presented on a particular display device. Based on this information, the source material can be modified to better suit that display device. This can be beneficial, for example, in enabling users to present content consistently across multiple different display devices, even if the display devices present visual content differently relative to one another. As another example, the techniques described herein can be used to quantify the performance of several different display devices, such that their respective performances can be compared to one another objectively. This can be beneficial, for example, in enabling users to select, deploy, and maintain systems that present visual content in a more accurate manner.

Figure 1:
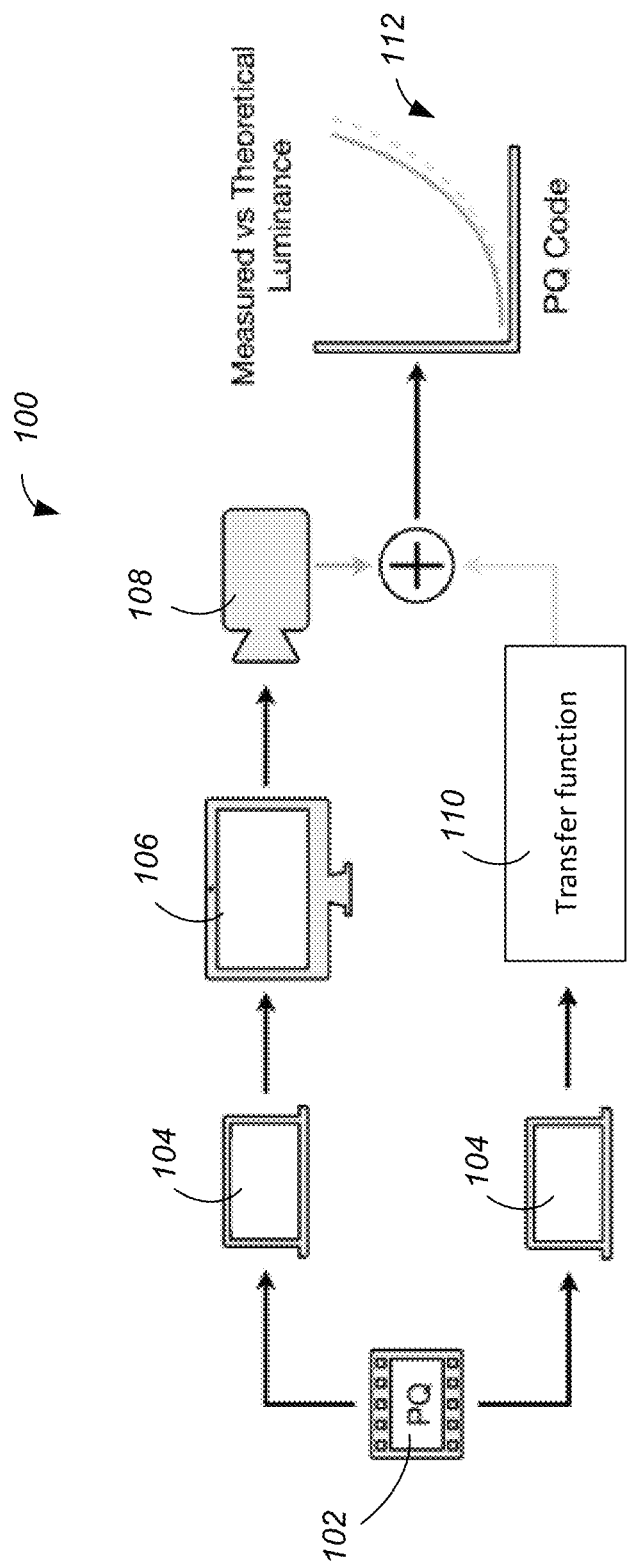
FIG. 1 is a diagram of an example system for measuring and quantifying the performance of a display device.

FIG. 1 shows an example system 100 for measuring and quantifying the performance of a display device.

In the system 100, a processing device 104 receives encoded image data 102 that includes visual content to be presented on a display device 106. The processing device 104 decodes the encoded image data 102, and instructs the display device 106 to display the visual content based on the decoded information.

The processing device 104 can include any number of electronic devices that are configured to process electronic data. As an example, the processing device 104 can be include one or more computer systems (e.g., one or more desktop computers, notebook computers, tablet computers, etc.). As another example, the processing device 104 can include one more mobile or wearable devices (e.g., one or more smart phones, smart watches, head mounted display systems such as virtual reality systems or augmented reality systems, etc.). As another example, the process device 104 can include one or more video game consoles. As another example, the processing device 104 can include one or more video signal generators that do not take the encoded image data 102 as an input to decode, but rather receive user commands and generate a specific color and luminance level with a given transfer function based on those commands.

In some implementations, the encoded image data 102 can include static visual content (e.g., one or more images) or dynamic visual content (e.g., one or more videos). In some implementations, the encoded image data 102 can include one or more image files or video files storing information regarding one or more images or videos that can be displayed of a display device.

In some implementations, the encoded image data 102 can also include one or more parameters specifying that the visual content should be presented according to a particular luminance on the display device 106. As an example, the encoded image data 102 can include one or more Perceptual Quantizer (PQ) codes (or "codewords") generated according to a PQ function, as defined by the Society of Motion Picture and Television Engineers (SMPTE) (e.g., as described in SMPTE ST 2084:2014, which is incorporated herein by reference). The PQ function is a non-linear electro-optical transfer function (EOTF) that specifies how an optical system handles different frequencies of light. For instance, the PQ function defines the relationship between a particular PQ code (e.g., a numerical value) and a corresponding luminance (e.g., the luminous intensity per unit area of light travelling in a given direction) for the presentation of visual content. The one or more PQ codes in the encoded image data 102 can be extracted by the processing device 104 and used to regulate the presentation of the visual content on the display device 106.

The display device 106 presents the visual content included in the encoded image data 102. For instance, the display device 106 can include one or more display panels (e.g., a liquid-crystal display (LCD) panels, light-emitting diode (LED) panels, organic light emitting diode (OLED) panels, etc.), cathode ray tubes, light projectors (e.g., digital cinema, laser projectors, etc.), or other such devices that are configured to emit patterns of light selectively towards a user or towards a projection screen that reflects light selectively towards a user. In particular, the display device 106 can emit patterns of light towards a user, such that the user can perceive one or more images or videos, as specified by the encoded image data 102. Further, the display device 106 can control the intensity of the emitted light in accordance with the one or more PQ codes included in the encoded image data 102 (e.g., such that the visual content is presented according to a specified luminance).

In some implementations, the visual content that is presented by the display device 106 may deviate from what was specified by the encoded image data 102. As an example, although the encoded image data 102 may specify that certain colors be presented, the display device 106 may present one or more of those colors inaccurately (e.g., such that one or more different colors are presented instead). As another example, although the encoded image data 102 may specify that visual content be presented according to a particular luminance, the display device 106 may present the visual content at a different luminance.

The accuracy by which the visual content is presented by the display device 106 can be determined by measuring the properties of the presented visual content, and comparing the measurements to an "ideal" or "theoretical" presentation of the visual content (e.g., as specified by the encoded image data 102 or video signal generator). In some implementations, the ideal or theoretical presentation of the visual content may be referred to as the "ideal response" of a display device.

For instance, referring to FIG. 1, a light measurement device 108 can be used to measure one or more properties of the visual content that is presented by the display device 106 (e.g., the luminance of the light emitted by the display device 106). As examples, the light measurement device 108 can include one or more spectroradiometers, colorimeters, or other such devices.

Further, one or more properties regarding an "ideal" or "theoretical" presentation of the visual content can be determined based on the encoded image data 102. For example, these properties may correspond to a completely accurate presentation of the visual content (e.g., an "ideal response"), as specified by the encoded image data 102. As shown in FIG. 1, in some implementations, these properties can be determined by extracting the one or more PQ codes included in the encoded image data 102, and inputting the one or more PQ codes into a transfer function 110 having the PQ codes as an input and one or more luminance values as an output (e.g., using the processing device 104).

In some implementations, the transfer function 110 can be the PQ function, as defined by SMPTE (e.g., as described in SMPTE ST 2084:2014). For example, the transfer function 110 can be:

$$L = \left( \frac{\max\left[\left(N^{\frac{1}{m_2}} - c_1\right), 0\right]}{c_2 - c_3 N^{\frac{1}{m_2}}} \right)^{1/m_1},$$

where L is the luminance, N is the PQ code (e.g., as specified by the encoded image data 102), and $c_1$, $c_2$, $c_3$, $m_1$, and $m_2$ are constants. For example, in some implementations:

$$c_1 = c_3 - c_2 + 1 = \frac{107}{128} = 0.8359375,$$

$$c_2 = \frac{2413}{128} = 18.8515625,$$

$$c_3 = \frac{2392}{128} = 18.6875,$$

-continued $$m_1 = \frac{1305}{8192} = 0.1593017578125,$$

and $$m_2 = \frac{2523}{32} = 78.84375.$$

In some implementations, this process can be performed several times across a range of PQ codes. For example, the display device 106 can present visual content according to several different PQ codes (e.g., in a sequence). For each PQ code, the light measurement device 108 can measure the luminance of the light emitted by the display device for that PQ code.

The measurement data obtained by the light measurement device 108 and the output of the transfer function 110 can be compared to one another to determine the accuracy by which the display device presents visual content. For instance, a processing device (e.g., the processing device 104) can generate a chart 112 that indicates the luminance of light measured by the light measurement device 108 (e.g., representing the actual presentation of visual content by the display device 106). Further, the plot can also indicate the luminance of light that was specified by the encoded image data 102 (e.g., representing the ideal response of the display device). The chart 112 can be used to identify deficiencies in the performance of the display device 106.

Figure 2:
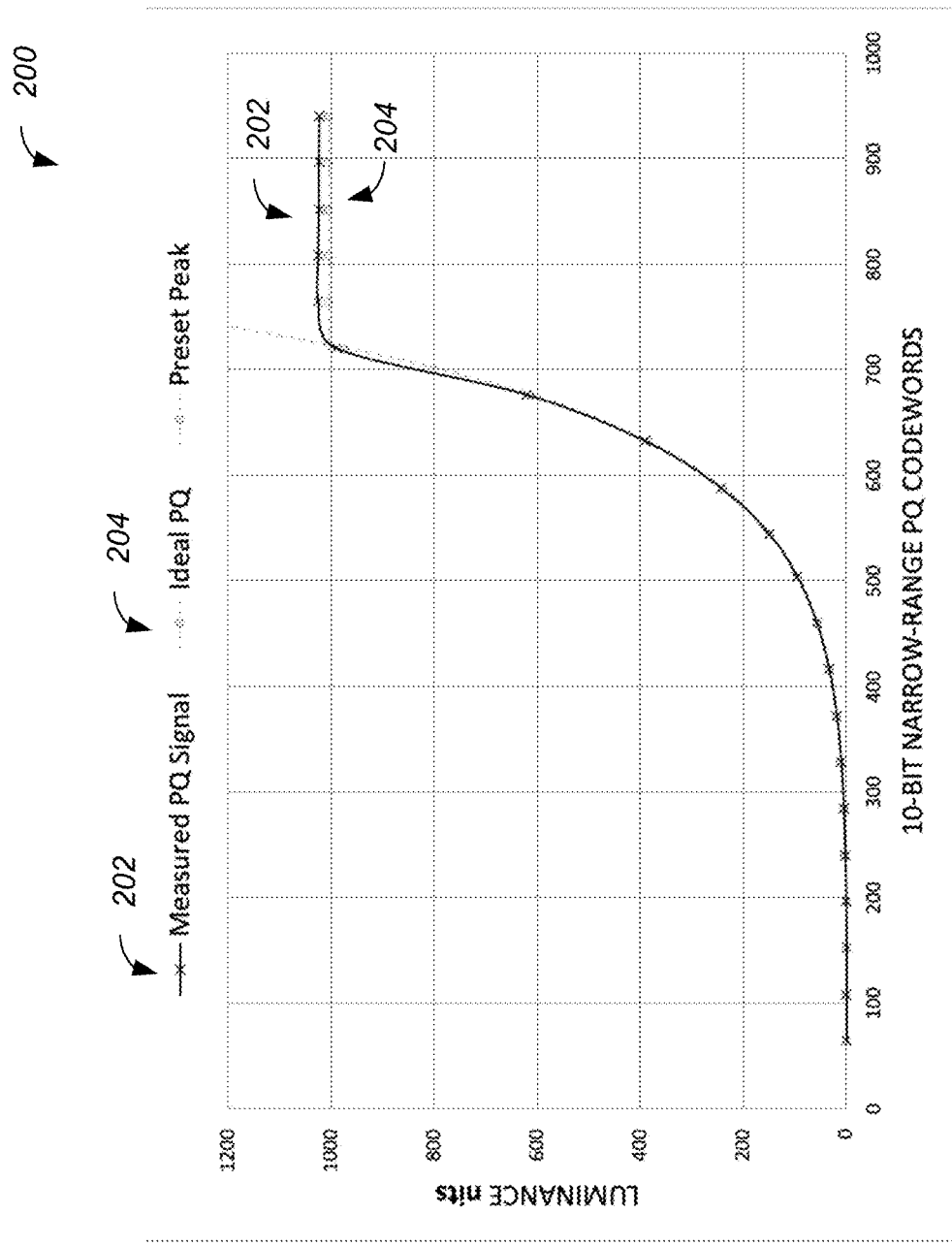
FIG. 2 is an example chart describing the performance of a display device.

For example, FIG. 2 shows an example chart 200 that can be generated based on the techniques described above. In this example, the plot 202 (represented by a solid line with x-markers) indicates the measured luminance of light (vertical axis) over a range of specified PQ codes (horizontal axis). The plot 202 can be generated, for example, by presenting static visual content (e.g., a solid gray pattern) on the display device 106 according to several different PQ codes, and measuring the corresponding luminance of the light emitted by the display device 106 for each of the PQ codes.

Further, the plot 204 (represented by a dotted line with o-markers) indicates the ideal luminance (vertical axis) over the same range of specified PQ codes (horizontal axis). The plot 204 can be generated, for example, by inputting several different PQ codes into the transfer function 110, and outputting the corresponding luminance values.

As shown in FIG. 2, the display device does not display visual content completely accurately across the range of PQ values (e.g., as indicated by a deviation between the plots 202 and 204). However, due to a compressive effect of the transfer function's non-linearity, it is relatively easier to identify errors in the higher luminance range (e.g., 500 nits and above, in this example), than it is to identify errors in the lower luminance range. For example, the distance between the two plots 202 and 204 is more readily apparent in the higher luminance range.

Further, even in the range where it is relatively easier to visualize the error based on the distance between the two plots 202 and 204, this distance may not directly correspond to the significance of the error. For example, intuitively, larger errors may be less desirable than smaller errors. However, the perceptibility of error is non-uniform across the luminance range. That is, in some implementations, larger error distances at higher luminance levels may be no worse than smaller error distances at lower luminance levels where the human visual system is more sensitive. Additionally, the direction of error relative to ideal response may be significant, particularly when the error is non-monotonic with respect to the ideal response (e.g., when the error at one luminance point is an undershoot and a following error at another luminance point is an overshoot). In some implementations, the error may be particularly perceptible to a user when the error continually switches between undershoot and overshoot in a periodic manner, thus increasing the quantized luminance step between adjacent code points relative to the ideal response.

To better quantify the performance of a display device (particularly with respect to the perceptibility of errors), one or more metrics ΔPQ can be determined by comparing the PQ code that is specified by encoded image data (e.g., indicating a particular specified luminance for the presentation of visual content, or the ideal response to the display device), and the PQ code corresponding to the actual presentation of visual content by the display device (e.g., corresponding to the actual response of the display device). This can be beneficial, for example, as it enables errors in the presentation of visual content by a display device to be identified more readily across a range of luminance values (e.g., compared to the techniques described with respect to FIG. 1 and FIG. 2).

Figure 3:
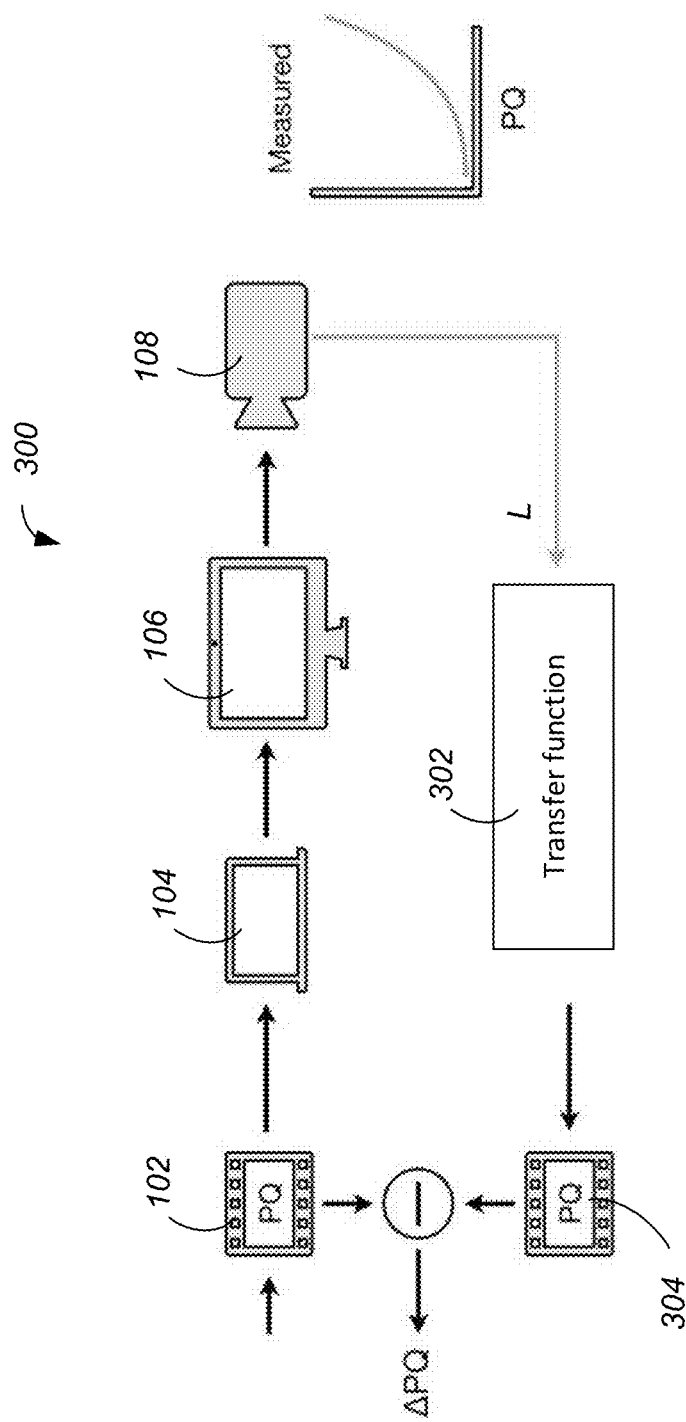
FIG. 3 is a diagram of another example system for measuring and quantifying the performance of a display device.

To illustrate, FIG. 3 shows an example system 300 for measuring and quantifying the performance of a display device.

Aspects of the system 300 can be similar to those in the system 100 shown in FIG. 1. For example, in the system 300, a processing device 104 receives encoded image data 102 that includes visual content to be presented on a display device 106. The processing device 104 decodes the encoded image data 102, and instructs the display device 106 to display the visual content based on the decoded information.

As described above, the processing device 104 can include any number of electronic devices that are configured to process electronic data. As an example, the processing device 104 can be include one or more computer, mobile or wearable devices, or video signal generators, and/or video game consoles.

Further, as described above, the encoded image data 102 can include static visual content or dynamic visual content. In some implementations, the encoded image data 102 can include one or more image files or video files storing information regarding one or more images or videos that can be displayed of a display device.

Further, as described above, in some implementations, the encoded image data 102 can also include one or more parameters specifying that the visual content should be presented according to a particular luminance on the display device 106. As an example, the encoded image data 102 can include one or more first PQ codes generated according to a PQ function, as defined by SMPTE (e.g., as described in SMPTE ST 2084:2014, which is incorporated herein by reference). The one or more first PQ codes in the encoded image data 102 can be extracted by the processing device 104 and used to regulate the presentation of the visual content on the display device 106.

Further, as described above, the display device 106 presents the visual content included in the encoded image data 102. For instance, the display device 106 can include one or more display panels, cathode ray tubes, light projectors, or other such devices that are configured to emit patterns of light selectively towards a user. In particular, the display device 106 can emit patterns of light towards a user, such that the user can perceive one or more images or videos, as specified by the encoded image data 102. Further, the display device 106 can control the intensity of the emitted light in accordance with the one or more first PQ codes included in the encoded image data 102 (e.g., such that the visual content is presented according to a specified luminance).

As described above, in some implementations, the visual content that is presented by the display device 106 may deviate from what was specified by the encoded image data 102. The accuracy by which the visual content is presented by the display device 106 can be determined by measuring the properties of the presented visual content, and comparing the measurements to an "ideal" or "theoretical" presentation of the visual content (e.g., as specified by the encoded image data 102).

For example, as described above, a light measurement device 108 can be used to measure one or more properties of the visual content that is presented by the display device 106 (e.g., the luminance of the light emitted by the display device 106). As examples, the light measurement device 108 can include one or more spectroradiometers, colorimeters, or other such devices.

Further, these measurements can be converted into corresponding second PQ codes 304 using a transfer function 302 having the measurements (e.g., one or more luminance values) as an input and one or more second PQ codes 304 as an output.

In some implementations, the transfer function 302 can be an inverse of the PQ function, as defined by SMPTE (e.g., as described in SMPTE ST 2084:2014). For example, the transfer function 302 can be:

$$N = \left(\frac{c_1 + c_2 \cdot L^{m_1}}{1 + c_3 \cdot L^{m_1}}\right)^{m_2}$$

where N is the PQ code, L is the luminance (e.g., as measured by the light measurement device 108), and $c_1$, $c_2$, $c_3$, $m_1$, and $m_2$ are constants. For example, in some implementations:

$$c_1 = c_3 - c_2 + 1 = \frac{107}{128} = 0.8359375,$$

$$c_2 = \frac{2413}{128} = 18.8515625,$$

$$c_3 = \frac{2392}{128} = 18.6875,$$

$$m_1 = \frac{1305}{8192} = 0.1593017578125,$$

and $$m_2 = \frac{2523}{32} = 78.84375.$$

The accuracy by which the display device 106 presents visual content can be determined by comparing the one or more first PQ codes that are included in the encoded image data 102 to the one or more second PQ codes 304 output by the transfer function 302. For example, as shown in FIG. 3, an arithmetic difference can be determined between each of the second PQ codes 304 output by the transfer function 302, and a corresponding one of the first PQ codes that are included in the encoded image data 102, resulting in one or more metrics ΔPQ. This calculation can be performed, for example, by the processing device 104. Intuitively, a positive ΔPQ value denotes that the display device is displaying visual content according to a higher luminance than that specified by the encoded image data, whereas a negative ΔPQ value denotes that the display device is displaying visual content according to a lower luminance than that specified by the encoded image data. A zero ΔPQ value denotes that the display device is displaying visual content according to the luminance that is specified by the encoded image data.

In some implementations, this process can be performed several times across a range of PQ codes. For example, the display device 106 can present visual content according to several first PQ codes (e.g., in a sequence). For each of the first PQ codes, the light measurement device 108 can measure the luminance of the light emitted by the display device for that first PQ code. Further, for each first PQ code, a processing device (e.g., the processing device 104) can determine a corresponding second PQ codes based on the measurements, and determine a ΔPQ value based on the difference between the second PQ code and the corresponding first PQ code.

In some implementations, the metric ΔPQ can provide better insight into the perceptibility of an error by a user (e.g., compared to comparing luminance values across a particular value). For example, the PQ function is designed, in part, to approximate the non-linear human visual system response to changing luminance levels. In particular the PQ function can be used to map digital codes (e.g., PQ codes) to display luminance levels, such that each adjacent step in the digital code value (e.g., an increase of 1 in the PQ code) is approximately (or just less than) a "Just Noticeable Difference" (JND) in luminance change. Accordingly, under ideal conditions (e.g., ideal display capability, ambient viewing conditions, video bit-depth and signal integrity) users may find they cannot or can just barely differentiate two adjacent PQ code values. Further, this relationship holds across the luminance range. For example, ΔPQ of 5 has approximately the same perceptual significance for dark grays as it does for bright whites (e.g., to align with human perception code steps in the dark luminance range must be very small compared to the higher luminance ranges).

Figure 4:
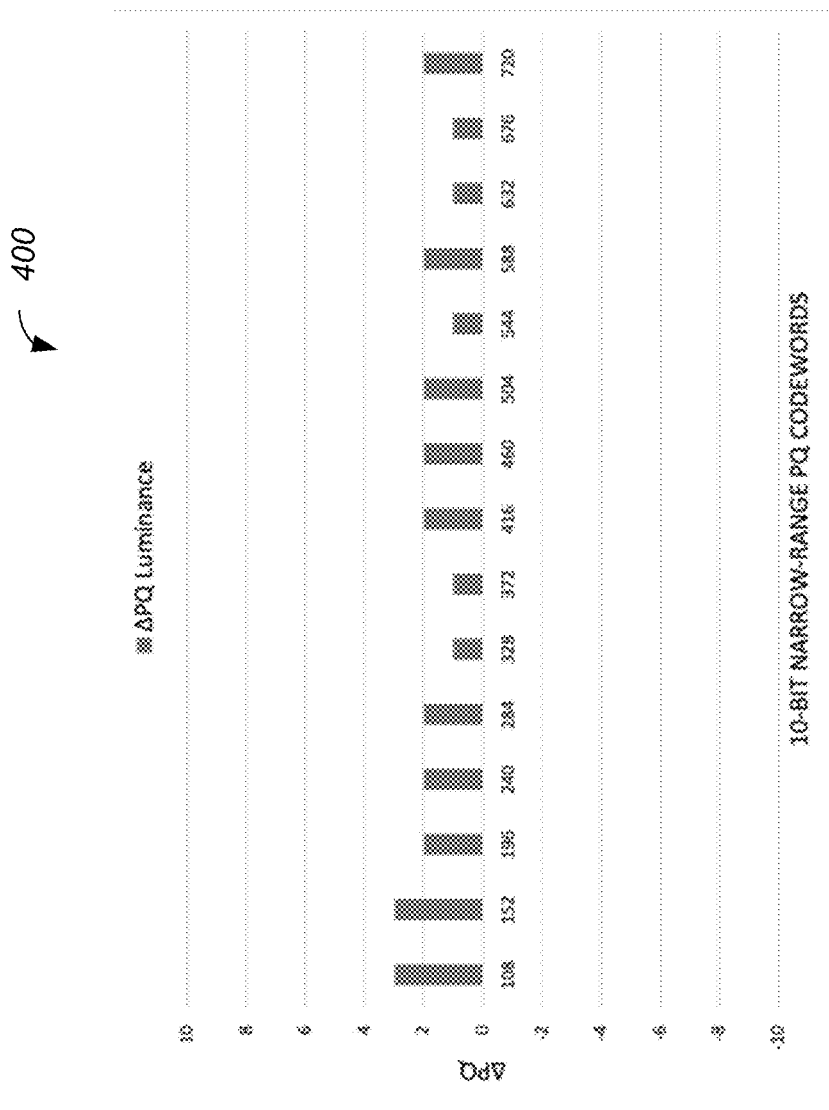
FIG. 4 is another example chart describing the performance of a display device.

To illustrate, FIG. 4 shows an example chart 400 that can be generated based on the techniques described above. In this example, the chart 400 was calculated using the same measurement data that was used to calculate the chart 200 in FIG. 2. As shown in FIG. 4, the chart 400 includes several ΔPQ values (vertical axis) calculated across a range of specified PQ codes (horizontal axis). The chart 400 can be generated, for example, by presenting static visual content (e.g., a solid gray pattern) on the display device 106 according to several different first PQ codes, measuring the corresponding luminance of the light emitted by the display device 106 for each of the first PQ codes, calculating second PQ codes corresponding to the measurements, and determining ΔPQ values based on the differences between each of the second PQ codes and a corresponding once of the first PQ codes.

In the example shown in FIG. 2, the error in the presentation of visual content by the display device is relatively difficult to determine, particularly in the lower luminance range. However, as shown in FIG. 4, this error is comparatively easier to determine across a wider luminance range. For instance, in this example, the error is most significant, in perceptual terms, in the lower luminance range (e.g., corresponding to PQ codes 284 and below). As an example, given the first PQ code of 108, the display device displays visual content according to a ΔPQ value of approximately 3 (e.g., the luminance of light emitted by the display device corresponds to a second PQ code of approximately 111). Accordingly, under these conditions, the error is approximately three times greater than the JND that can be perceived by a user. This error is not as readily apparent in the chart 200 shown in FIG. 2.

In the examples shown in FIGS. 1 and 3, encoded image data 102 includes one or more PQ codes for presenting visual content on the display device 106. However, in some implementations, the encoded image data 102 can include other parameters for specifying the luminance with which visual content should be presented. As an example, in some implementations, the encoded image data 102 can include one or more gamma values that encode luminance information (e.g., as defined in the Internal Telecommunication Union, Radiocommunication Sector (ITU-R) BT.1886 technical standards, the contents of which are incorporated by reference).

Figure 5:
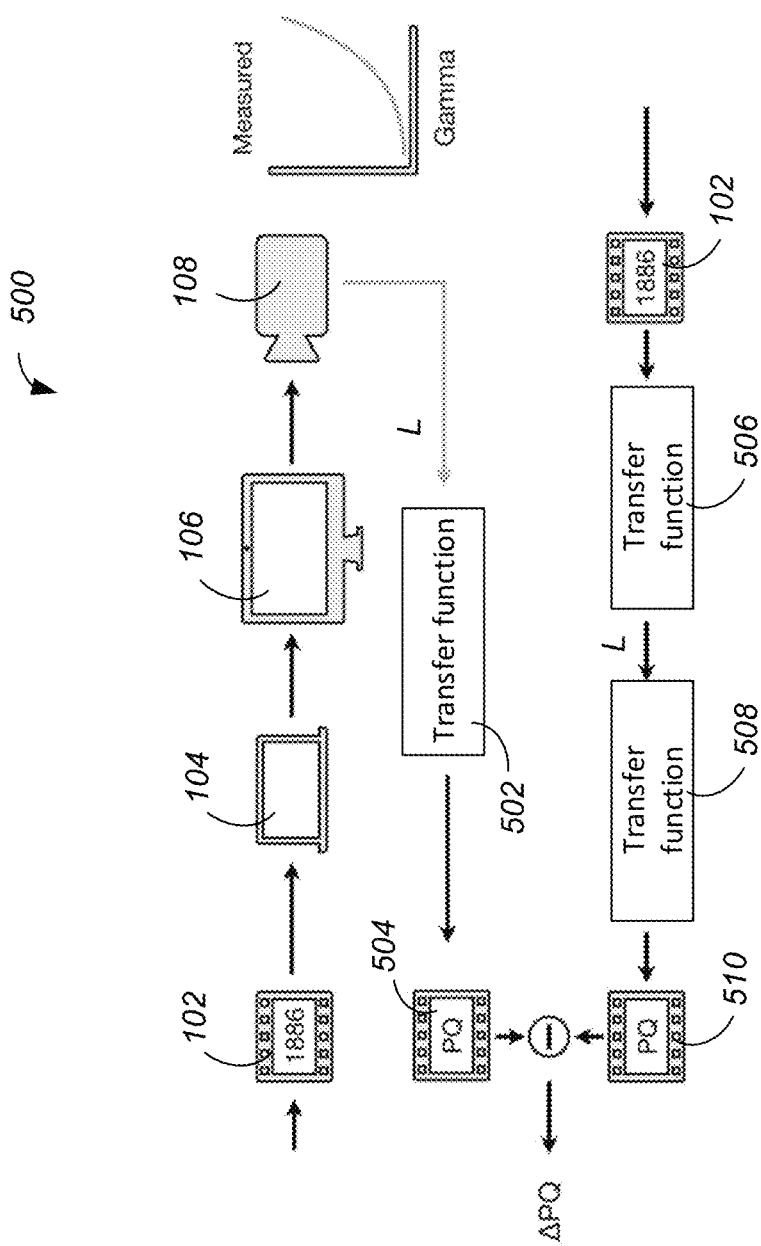
FIG. 5 is a diagram of another example system for measuring and quantifying the performance of a display device.

To illustrate, FIG. 5 shows an example system 500 for measuring and quantifying the performance of a display device.

Aspects of the system 500 can be similar to those in the system 100 shown in FIG. 1 and/or the system 300 shown in FIG. 3. For example, in the system 500, a processing device 104 receives encoded image data 102 that includes visual content to be presented on a display device 106. The processing device 104 decodes the encoded image data 102, and instructs the display device 106 to display the visual content based on the decoded information.

As described above, the processing device 104 can include any number of electronic devices that are configured to process electronic data. As an example, the processing device 104 can be include one or more computer, mobile or wearable devices, and/or video game consoles.

Further, as described above, the encoded image data 102 can include static visual content or dynamic visual content. In some implementations, the encoded image data 102 can include one or more image files or video files storing information regarding one or more images or videos that can be displayed of a display device.

Further, as described above, in some implementations, the encoded image data 102 can also include one or more parameters specifying that the visual content should be presented according to a particular transfer function on the display device 106 (e.g., a transfer function specifying a particular luminance or relative luminance, given a particular input). In this example, the encoded image data 102 can include one or more gamma values (e.g., as defined by the ITU-R BT.1886 technical standards). The one or more gamma values in the encoded image data 102 can be extracted by the processing device 104 and used to regulate the presentation of the visual content on the display device 106.

Further, as described above, the display device 106 presents the visual content included in the encoded image data 102. For instance, the display device 106 can include one or more display panels, cathode ray tubes, light projectors, or other such devices that are configured to emit patterns of light selectively towards a user. In particular, the display device 106 can emit patterns of light towards a user, such that the user can perceive one or more images or videos, as specified by the encoded image data 102. Further, the display device 106 can control the intensity of the emitted light in accordance with the one or more gamma values included in the encoded image data 102 (e.g., such that the visual content is presented according to a specified luminance).

As described above, in some implementations, the visual content that is presented by the display device 106 may deviate from what was specified by the encoded image data 102. The accuracy by which the visual content is presented by the display device 106 can be determined by measuring the properties of the presented visual content, and comparing the measurements to an "ideal" or "theoretical" presentation of the visual content (e.g., as specified by the encoded image data 102).

For example, as described above, a light measurement device 108 can be used to measure one or more properties of the visual content that is presented by the display device 106 (e.g., the luminance of the light emitted by the display device 106). As examples, the light measurement device 108 can include one or more spectroradiometers, colorimeters, or other such devices.

Further, these measurements can be converted into corresponding first PQ codes 504 using a transfer function 502 having the measurements (e.g., one or more luminance values) as an input and one or more second PQ codes 304 as an output. The transfer function 502 can be similar to the transfer function 302 described with respect to FIG. 3. For example, the transfer function 502 can be an inverse of the PQ function, as defined by SMPTE (e.g., as described in SMPTE ST 2084:2014).

Further, a processing device (e.g., the processing device 104) can convert the one or more gamma values in the encoded image data 102 into one or more corresponding second PQ codes. For example, referring to FIG. 5, a processing device can calculate luminance values using a transfer function 506 having one or more gamma values as an input, and one or more corresponding luminance values as an output. As an example, the transfer function 506 can be:

$$L = \alpha(\max[V+b], 0)^\gamma,$$

where L is the luminance, $\gamma$ is the gamma value, $\alpha$ is a user gain control variable (e.g., sometimes referred to as "contrast"), and b is the black level lift (e.g., sometimes referred to as "brightness"). Additional details regarding this transfer function are described in the ITU-R BT.1886 technical standards.

Further, the one or more luminance values can be converted into one or more corresponding second PQ codes 510. For example, referring to FIG. 5, a processing device can calculate second PQ codes using a transfer function 508 having one or more luminance values as an input, and one or more second PQ codes as an output. The transfer function 508 can be similar to the transfer functions 302 and 502 (e.g., as described with respect to FIGS. 3 and 5, respectively). For example, the transfer function 508 can be an inverse of the PQ function, as defined by SMPTE (e.g., as described in SMPTE ST 2084:2014).

The accuracy by which the display device 106 presents visual content can be determined by comparing the one or more first PQ codes 504 that are output by the transfer function 502, and the one or more second PQ codes 510 that are output by the transfer function 508. For example, as shown in FIG. 5, an arithmetic difference can be determined between each of the first PQ codes 504 and a corresponding one of the second PQ codes 510, resulting in one or more ΔPQ values. This calculation can be performed, for example, by the processing device 104.

In some implementations, this process can be performed several times across a range of gamma values. For example, the display device 106 can present visual content according to several gamma values (e.g., in a sequence). For each of the gamma values, the light measurement device 108 can measure the luminance of the light emitted by the display device for that gamma value. Further, for each of the gamma values, a processing device (e.g., the processing device 104) can determine a first PQ code corresponding to the measurement. Further, for each gamma value, the processing device can also convert that gamma value into a corresponding second PQ code, and determine a ΔPQ value based on the difference between the first PQ code and the corresponding second PQ code.

Although FIG. 5 shows an example system for measuring and quantifying the performance of a display device using encoded image data having one or more gamma values, this is merely an illustrative example. In practice, a system can measure and quantify the performance of a display device using encoded image data having one or more other types of parameters for specifying luminance. As examples, parameters can be specified by transfer functions described in Hybrid-Log-Gamma (HLG), ITU-R BT.2100, Digital Cinema Initiatives (DCI) digital cinema SMPTE Engineering Guide (EG) 432-1, and SMPTE Recommended Practice (RP) 431-2.

In some implementations, the metric ΔPQ can be determined with respect to a single color. As an example, referring to FIG. 4, the metric ΔPQ can be calculated for a 10-bit narrow range gray (e.g., in which the values of the red, green, and blue color channels are all equal). This can be beneficial, for example, in determining the general performance of a display device according to a particular luminance, with respect to multiple color channels concurrently.

However, in some implementations, the metric ΔPQ can be determined with respect to multiple different colors individually. For example, each metric ΔPQ can be "decomposed" into separate ΔPQ metrics, each representing the performance of the display device according to particular luminance, with respect to a different color. In some implementations, the metric ΔPQ can be determined for one or more colors such as red, green, blue, cyan, magenta, yellow, or any other color (or any combination thereof). This can be beneficial, for example, in determining the performance of a display device according to a particular luminance, with respect to one or more specific color channels individually. For example, this enables deficiencies in the performance of a display device to be attributed to a particular color, as well as to a particular luminance level.

In some implementations, this can be performed by obtaining separate light measurements according to each of the several different colors. For example, referring to FIGS. 1, 3 and 5, the light measurement device 108 can obtain several different luminance measurements, each according to a different wavelength of light or ranges of wavelengths of light (e.g., corresponding to different colors or ranges of colors). These measurements can be used to determine ΔPQ values that are specific to those wavelengths of light or ranges of wavelengths of light (e.g., a similar manner as described above with respect to FIGS. 3 and 5). In some implementations, measurement can be limited to visible wavelengths of light (e.g., wavelengths of light that can be perceived by a human). In some implementations, measurement can also be performed with respect to wavelengths of light that cannot be received by a human (e.g., infrared and/or ultraviolet light).

Figure 6:
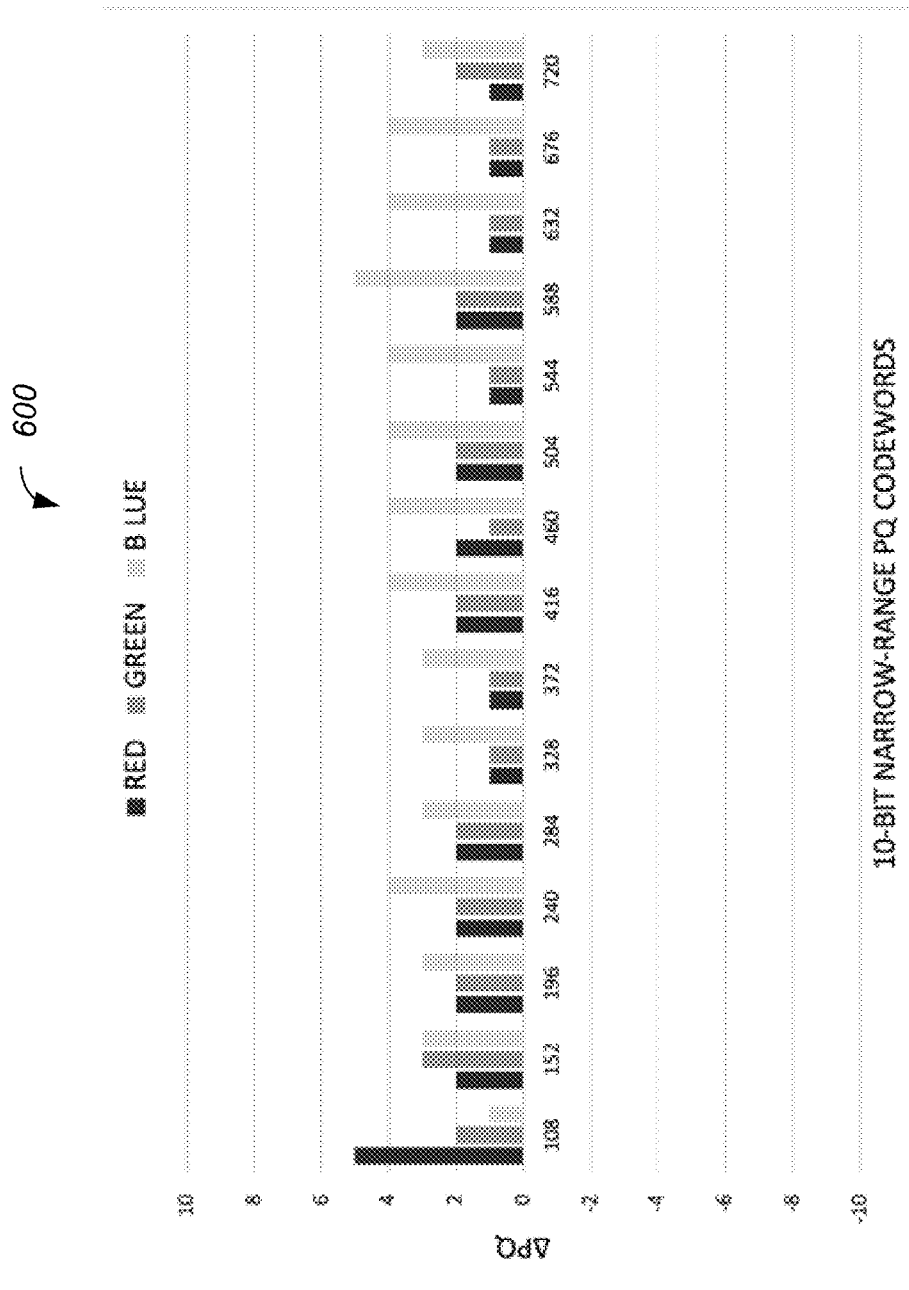
FIGS. 6-8 are additional example charts describing the performance of a display device.

To illustrate, FIG. 6 shows an example chart 600 that can be generated based on the techniques described above. In this example, the chart 600 was calculated using the similar measurement data that was used to calculate the charts 200 and 400 in FIGS. 2 and 4, respectively. However, in this example, instead of obtaining measurements with respect to a single color (e.g., 10-bit narrow range gray), measurements have been decomposed with respect to three different colors: red, green, and blue. As shown in FIG. 6, the chart 600 includes several ΔPQ values (vertical axis) calculated across a range of specified PQ codes (horizontal axis). Further, the chart 600 includes separate ΔPQ values for each color.

In this example, each color's contribution to the error is not uniform, and varies depending on the luminance level. For instance, for the lower PQ codes (e.g., corresponding to lower luminance levels), the error in the display device is primarily the result of an excess of red light emission (e.g., the red ΔPQ values are higher than those of for blue and green for the lower PQ codes). However, for higher PQ codes (e.g., corresponding to high luminance levels), the error in the display is primarily the result of an excess of blue light (e.g., the blue ΔPQ values are higher than those of for red and green for the higher PQ codes). Accordingly, based on this analysis, the source of errors with respect to the display device can be identified according to a greater degree of granularity.

Figure 7A:
Figure 7B:
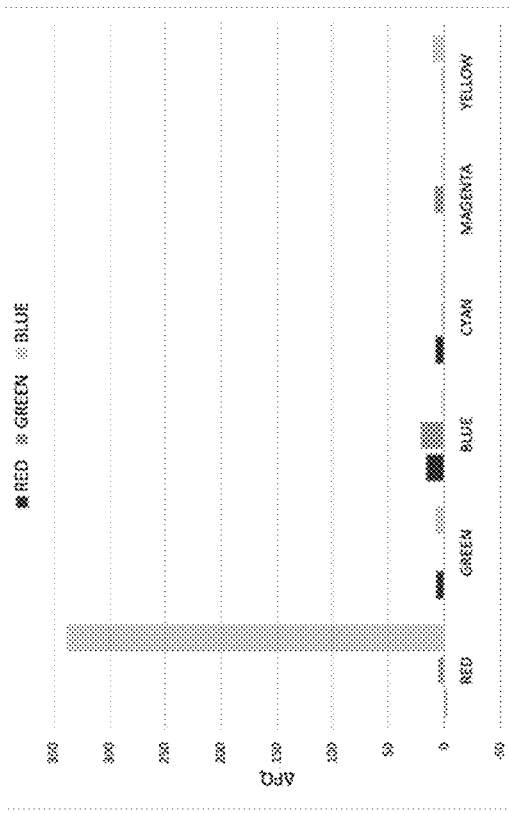

In some implementations, a similar ΔPQ additive color error analysis can be performed with respect to particular colors. For example, FIGS. 7A and 7B show example chart 700 and 750, respectively, showing a color error analysis for the P3 primaries in the container specified by ITU-R BT.2020 (the contents of which are incorporated by reference), in particular red, green, blue, cyan, magenta, and yellow. The chart 700 shows the color error analysis for a 100% signal amplitude, and the chart 750 shows the color error analysis for a 50% signal amplitude. In this example, the red primary color channel suffers for an excess of blue light for both the 100% signal amplitude and the 50% signal amplitude. That is, when the display device is instruction to emit red light, the light that is emitted also includes a perceptible amount of blue light, resulting in a perceptible color shift.

In some implementations, ΔPQ values (or the absolute value of ΔPQ values) can be interpreted against a particular threshold value, below which the result is considered "good" or "passing" (e.g., corresponding to an error that is imperceptible to a user, or is otherwise acceptable). In some implementations, the threshold value can be determined empirically (e.g., based on experimental studies to assess the perceptibility of errors with respect to various conditions).

Figure 8:
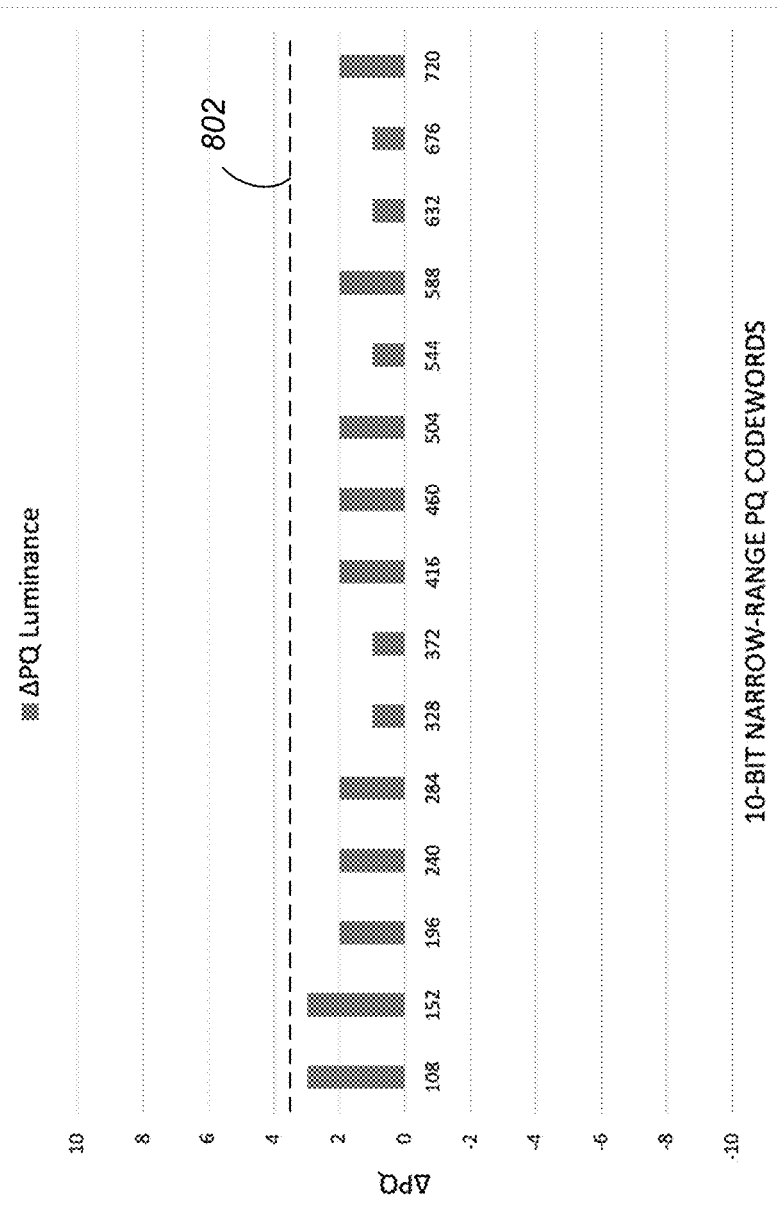

As an example, FIG. 8 shows an example chart 800 similar to the chart 600 shown in FIG. 6. In this example, the chart 800 also indicates a threshold value (indicated by a dotted line 802), corresponding to a ΔPQ value of approximately 3.8. ΔPQ values that are less than the threshold value can be considered "good" or "passing," whereas ΔPQ values that are greater than the threefold value can be considered "bad" or "not passing." Although a threshold value of 3.8 is described above, this is merely an illustrative example. In practice, other threshold values can be used in place of 3.8, depending on the implementations.

In some implementations, a single static threshold value can be used to evaluate one or more ΔPQ values. In some implementations, the threshold value can vary, depending on the use case. As an example, the threshold value for a particular use can be determined by cross-correlating the threshold value to another color difference metric (e.g., a metric other than ΔPQ).

Figure 9:
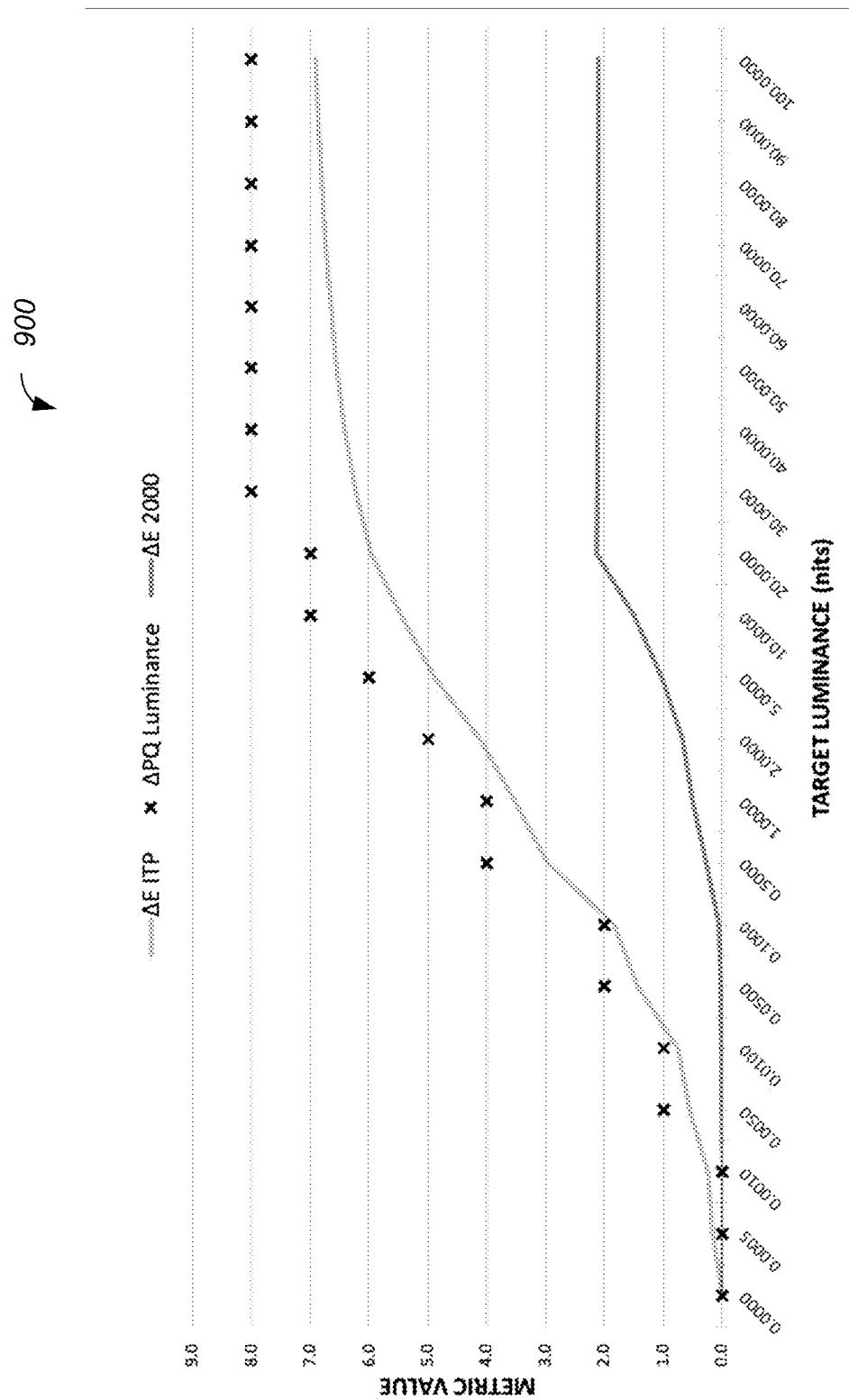
FIG. 9 is a chart showing an example correlation between threshold values for multiple color difference metrics.

For example, FIG. 9 shows a graph 900 including plots for ΔPQ, ΔE ITP (e.g., as defined in the ITU-R BT.2124 standard, the contents of which are incorporated by reference), and ΔE 2000 (e.g., as specified by the International Commission on Illumination (CIE)), for a uniform luminance deviation of +10% between the reference and measured values across the luminance range spanning 0 to 100 nits. Assuming a ΔE ITP value of 2.0 as a threshold of perceptually significant difference in ΔE ITP space, based on the chart 900, an inference can be made that this value coincidences with a value of 2 in ΔPQ as well (e.g., at 0.1 nit). However, as shown in FIG. 9, ΔPQ values are more generally slightly greater than their ΔE ITP counterparts. From 2 nits onwards, ΔPQ values are approximately +1 greater than their ΔE ITP counterparts. Therefore, threshold matching ΔPQ to ΔE ITP can be performed by selecting a value of 2.0 (e.g., corresponding to a relatively "strict" interpretation), or a value of 3.0 (e.g., corresponding to a relatively "relaxed" interpretation). As another example, the threshold value can be a piecewise value of 2.0 from 0 to 0.1 nit and 3.0 onwards (e.g., potentially providing higher correlation between ΔPQ to ΔE ITP).

In some implementations, a processing device (e.g., the processing device 104) can generate and present one or more notifications to a user based on a comparison between the ΔPQ values (or the absolute value of ΔPQ values) and the threshold values. For example, if a ΔPQ value (or absolute value of a ΔPQ value) is less than a threshold value, the processing device can generate a notification (e.g., a visual and/or auditory message) indicating that the display device is performing at an acceptable level. As another example, if a ΔPQ value (or absolute value of a ΔPQ value) is greater than a threshold value, the processing device can generate a notification (e.g., a visual and/or auditory message) indicating that the display device is not performing at an acceptable level. Further, notification can include an indication of one or more remedial actions that can be performed (e.g., instructions to re-calibrate the display device to improve its color accuracy and/or luminance accuracy).

In some implementations, the PQ codes specified in the encoded image data 102 and the metric ΔPQ can be expressed according to the same bit depth. For example, the encoded image data 102 can specify PQ codes according to a bit depth of 10 bits, and corresponding ΔPQ values can be generated according to the techniques described herein according to a bit depth of 10 bits. This can be beneficial, for example, in enabling a system to express the deviation between the color and/or luminance specified by source material and the color and/or luminance that are actually presented by the display device using the native PQ code space of the source material. In some implementations, a metric ΔPQ having a bit depth that is the same as the bit depth of the PQ codes specified by the encoded image data 102 may be referred to as a "native" ΔPQ.

Although a bit depth of 10 bit is described above, this is merely an illustrative example. In practice, the PQ codes and the metrics ΔPQ can have any bit depth. Example bit depths include 10 bits, 11 bits, 12 bits, 13 bits, 14 bits, 15 bits, and 16 bits.

In some implementations, the PQ codes specified in the encoded image data 102 and the metrics ΔPQ can be expressed according to different respective bit depths. For example, the encoded image data 102 can specify PQ codes according to a bit depth of 10 bits, and corresponding ΔPQ values can be generated according to the techniques described herein according to a bit depth of 12 bits. This can be beneficial, for example, in enabling a system to express the deviation between the color and/or luminance specified by source material and the color and/or luminance that are actually presented by the display device to a user according to a greater level of granularity than that provided by the native PQ code space of the source material.

For example, if this deviation is less than 1 PQ code having to a bit depth of 10 bits, using a metric ΔPQ having a bit depth of 10 bits, the deviation would be expressed as either 0 (e.g., rounded down) or 1 (e.g., rounded up). This may understate or overstate the deviation. However, using a metric ΔPQ having a bit depth of 12 bits, the deviation can be expressed with a greater degree of precision (e.g., as a fraction of a single PQ code). Further, using a metric ΔPQ having a greater bit depth (e.g., 12 bits or more) may ensure (or otherwise increase the likelihood) that a ΔPQ value of 1 is less than a JND in color and/or luminance change. In some implementations, a metric ΔPQ having a bit depth that is different from the bit depths of the PQ codes specified by the encoded image data 102 may be referred to as a "hybrid" or "extended" ΔPQ.

In some implementations, a system can generate metrics ΔPQ having a bit depth that is different from that of the PQ codes specified by the source material by performing calculations according to the bit depth of the metrics ΔPQ, rather than according to the bit depth of the PQ codes specified by source material. For example, referring to FIG. 3, the encoded image data 102 can specify PQ codes according to a bit depth of 10 bits. However, the transfer function 302 can output PQ codes 304 according to a bit depth of 12 bits (e.g., based on the output of the light measurement device 108). Similarly, the PQ codes specified by the encoded image data 102 can be converted into corresponding 12 bit values, prior to comparison with the PQ codes 304.

Although a PQ code bit depth of 10 bits and a metric ΔPQ bit depth of 12 bits are described above, these are merely illustrative examples. In practice, each of the PQ codes and the metrics ΔPQ can have any bit depth. Example bit depths include 10 bits, 11 bits, 12 bits, 13 bits, 14 bits, 15 bits, and 16 bits.

In the examples described above, the metrics ΔPQ are expressed as integers (e.g., as the difference between discrete PQ codes). However, this need not always be the case. For example, in some implementations, the metrics ΔPQ can be expressed as a decimal or floating float value. This can be beneficial, for example, in enabling a system to express the deviation between the color and/or luminance specified by source material and the color and/or luminance that are actually presented by the display device to a user according to a greater degree of precision (e.g., compared to the use a integer values).

In some implementations, at least some of the information generated by the techniques described herein can be stored for later retrieval. For example, at least some of the measurement data, corresponding PQ values, and resulting ΔPQ values can be stored in one or more data items, such as in one or more data tables, arrays, structures, lists, dictionary, and/or graphs. This can be beneficial, for example, as it enables the information to be readily retrieved and processed after generation, either by the same processing device that generated the information or by one or more other processing devices.

Further, at least some of the information generated by the techniques described herein can be presented to a user, such as through a graphical user interface (GUI). As an example, at least some of the measurement data, corresponding PQ values, and resulting ΔPQ values can be presented in the form of data tables, lists, and/or graphs (e.g., as such as FIGS. 4, 6, 7A, 7B, 8, and/or 9). This can be beneficial, for example, in enabling users to understand the information more readily, such that they can better use the information to guide the performance of one or more tasks (e.g., trouble-shooting errors with display devices, selecting display devices for deployment, creating visual content, etc.). In some implementations, multiple sets of information (e.g., corresponding to different measurements) can be presented in the GUI concurrently.

In some implementations, one or more of the techniques described herein can be used as a part of a calibration process for a display device. For example, the performance of a display device can be measured and quantified, and the performance can be represented using one or more ΔPQ values. Further, the calibration of the display device (e.g., color calibration and/or luminance calibration) can be adjusted to reduce the ΔPQ values (e.g., such the ΔPQ values are less than a particular threshold value, or are otherwise acceptable). In some implementations, the calibration process can be performed automatically, at least in part, by one or more processing devices (e.g., by automatically adjusting one or calibration parameters until certain criteria are met, such as the ΔPQ values being less than a particular threshold value).

In the examples shown in FIGS. 3 and 5, a processing device 104 determines one or more ΔPQ values based on information contained within encoded image data 102. However, this need not always be the case. For example, in some implementations, the processing device 104 can include one or more video signal generators that receive user commands and generate a specific color and luminance level with a given transfer function based on those commands.

Figure 10:
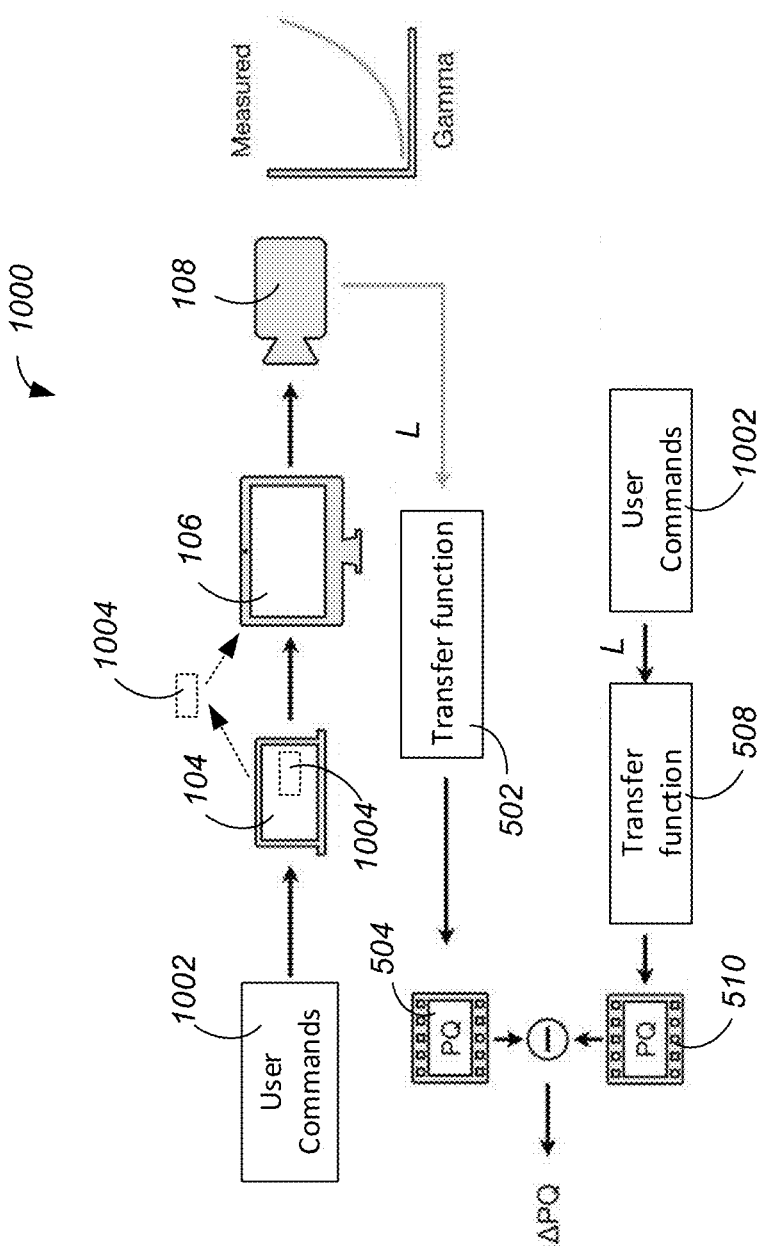
FIG. 10 is a diagram of another example system for measuring and quantifying the performance of a display device.

For example, FIG. 10 shows an example system 1000 for measuring and quantifying the performance of a display device. Aspects of the system 1000 can be similar to those in the system 300 shown in FIG. 3 and/or the system 500 shown in FIG. 5.

However, in this example, the processing device 104 can receive user commands 1002 specifying a particular color and luminance level, and using a signal generator 1004, instruct the display device 106 to display visual content according to the user's specifications. That is, instead of receiving encoded image data 102 (e.g., as shown in FIGS. 3 and 5), the processing device 104 can receive user commands 1002 instead. One or more first PQ codes 504 can be generated in a similar manner as described with respect to FIG. 5. Further, the processing device 104 can convert the specified luminance level into one or more corresponding second PQ codes 510 (e.g., using one or more transfer functions, such as the transfer function 508 having a luminance value as an input and a PQ code as an output). One or more ΔPQ values can be determined by determining an arithmetic difference each of the first PQ codes 504 and a corresponding one of the second PQ codes 510, as described above.

In some implementations, the video signal generators 1004 can be included in the processing device 104 (e.g., the processing device 104 can receive user commands, and generate visual content based on the user commands). In some implementations, the video signal generators can be included in another device (e.g., another processing device similar to the processing device 104). For example, another device can receive user commands, and generate visual content based on the user commands. In some implementations, the video signal generators can be a stand-alone device.

In some implementations, one or more of the techniques described herein can be used to guide the creation of visual content. For example, the techniques described herein can be used to determine the relationship between how visual content is encoded in source material, and how that visual content is presented on a particular display device. Based on this information, the source material can be modified to better suit that display device. In some implementations, this process can be performed automatically, at least in part, by one or more processing devices (e.g., by automatically adjusting the PQ codes in encoded image data to account for the performance of a particular display device).

In some implementations, one or more of the techniques described herein can be used to measure and quantify the performance of display device in a relatively dark viewing environment where the PQ transfer function is perceptually linear. In some implementations, one or more of the techniques described herein can be used to measure and quantify the performance of display device in relatively brighter viewing environments, either by applying a non-linear luminance dependent mapping to ΔPQ or choosing a larger threshold of perceptual difference. In some implementations, in scenarios where the user's visual adaptation state can be predicted with greater accuracy (such as with Augmented Reality (AR) headsets, Virtual Reality (VR) headsets, etc.), an ambient-adapted ΔPQ metric can be used as a feedback for shifting the white point and black point while rendering source PQ codes, thus enabling a simulated extended dynamic range, even with limited bit-depth.

Example Processes

Figure 11:
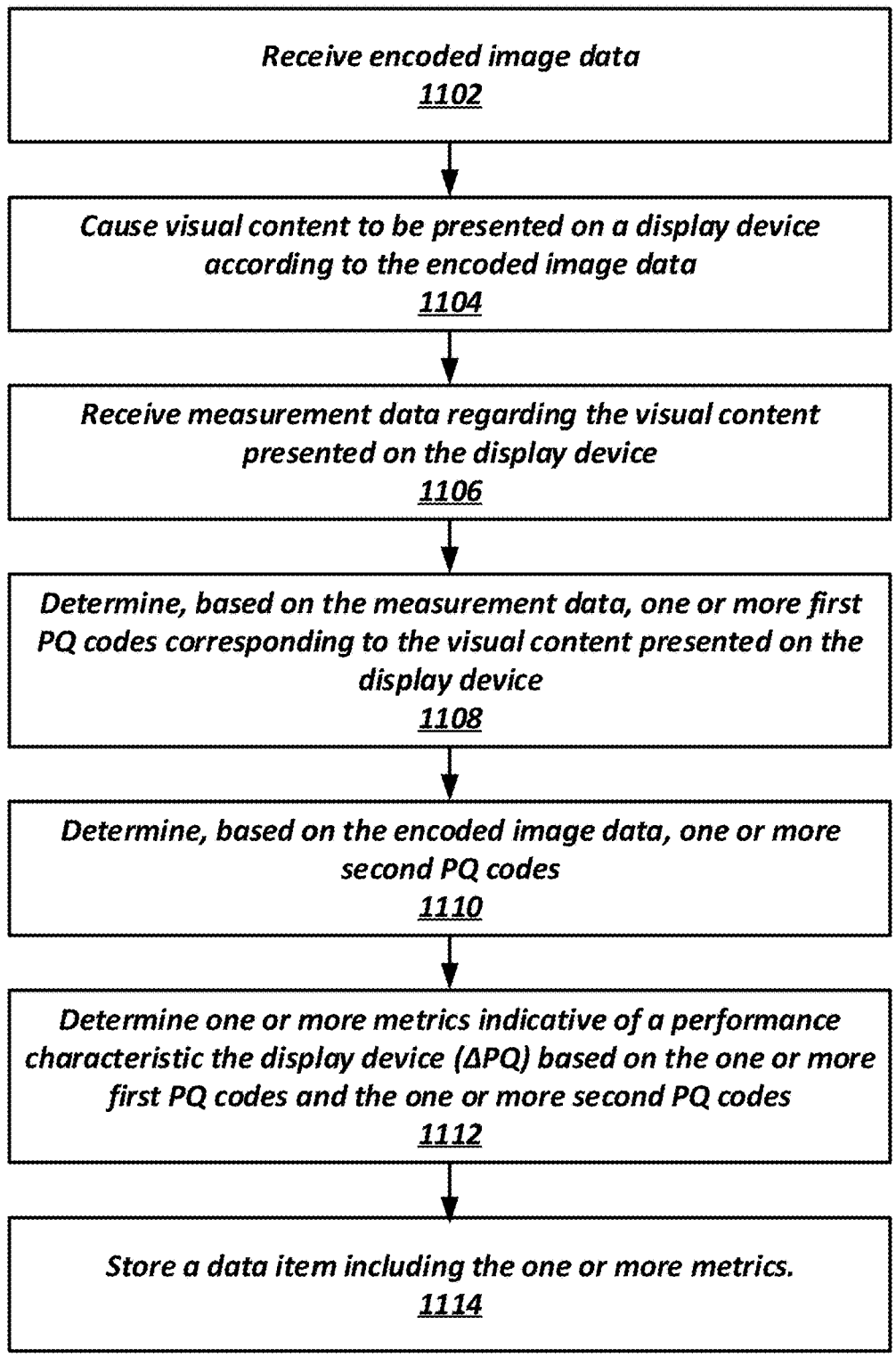
FIG. 11 is a diagram of an example process for measuring and quantifying the performance of a display device.

FIG. 11 illustrates an example process 1100 for measuring and quantifying the performance of a display device. The process 1100 can be performed for example, using one or more of the systems described herein (e.g., the systems 300, 500, 1000, and/or 1200, as shown in FIGS. 3, 5, 10, and 12, respectively).

According to the process 1100, one or more processing devices receives encoded image data (block 1102). As described above, in some implementations, the encoded image data can include static visual content (e.g., one or more images) or dynamic visual content (e.g., one or more videos). In some implementations, the encoded image data can include one or more image files or video files storing information regarding one or more images or videos that can be displayed of a display device.

The one or more processing devices cause visual content to be presented on a display device according to the encoded image data (block 1104). As described above, the display device can include one or more display panels (e.g., a liquid-crystal display (LCD) panels, light-emitting diode (LED) panels, organic light emitting diode (OLED) panels, etc.), cathode ray tubes, light projectors (e.g., digital cinema, laser projectors, etc.), or other such devices that are configured to emit patterns of light selectively towards a user or towards a projection screen that reflects light selectively towards a user.

The one or more processing devices receive measurement data regarding the visual content presented on the display device (block 1106). In some implementations, the measurement data can include one or more luminance values with respect to one or more wavelengths of light. The measurement data can be generated using a spectroradiometer, a colorimeter, or other such devices.

The one or more processing devices determine, based on the measurement data, one or more first perceptual quantizer (PQ) codes corresponding to the visual content presented on the display device (block 1108). In some implementations, the one or more first PQ codes can be determined based on a transfer function having at least a portion of the measurement data as an input (e.g., as shown and described with respect to FIGS. 3 and 5).

The one or more processing devices determine, based on the encoded image data, one or more second PQ codes (block 1110). In some implementations, the encoded image data can include the one or more second PQ codes (e.g., as shown and described with respect to FIG. 3). In some implementations, the one or more second PQ codes can be determined based on a transfer function having at least a portion of the encoded image data as an input (e.g., as shown and described with respect to FIG. 5).

The one or more processing devices determine one or more metrics indicative of a performance characteristic the display device based on the one or more first PQ codes and the one or more second PQ codes (block 1112). The one or more metrics can be one or more ΔPQ values, as described above. The one or more metrics can be indicative of a color accuracy of the display device and/or a luminance accuracy of the display device.

In some implementations, determining each of the one or more of the metrics can include determining a difference between one of the first PQ codes and a corresponding one of the second PQ codes. In some implementations, multiple metrics can be determined (e.g., using one or more of the techniques described above).

In some implementations, each of the metrics can be associated with respective color and a respective luminance value (e.g., as shown and described with respect to FIGS. 4 and 6-8. Example colors include red, green, blue, cyan, magenta, yellow, and gray (e.g., 10-bit narrow range gray).

The one or more processing devices store a data item including the one or more metrics (block 1114). The data item can include a data table, an array, a structure, a list, a dictionary, and/or a graph.

In some implementations, the one or more processing devices can also determine one or more threshold values, compare the one or more metrics to the one or more threshold values; and generate one or more notifications to a user based on the comparison.

In some implementations, the one or more processing devices can also cause a graphical user interface (GUI) to be presented to a user. The GUI can include a visual representation of the one or more metrics. For example, the visual representation can include a graph including at least some of the one more metrics (e.g., as shown in FIGS. 4 and 6-8). In some implementations, the visual representation can include multiple graphs, each including at least some of the one more metrics.

In some implementations, the one or more processing devices can also determine one or more modifications to an operation of the display device based the one or more metrics. As an example, the one or more modifications can include a modification to a color calibration of the display device.

In some implementations, the one or more first PQ codes can have a first bit depth, and the one or more second PQ codes can have a second bit depth that is different from the first bit depth. For example, the one or more first PQ codes can have a bit depth of 12 bits, and the one or more second PQ codes can have a bit depth of 10 bits.

In some implementations, the one or more first PQ codes can have a first bit depth, and the one or more second PQ codes can have a second bit depth that is the same as the first bit depth. For example, the one or more first PQ codes can have a bit depth of 10 bits, and the one or more second PQ codes can have a bit depth of 10 bits.

In some implementations, the one or more first PQ codes can be expressed as one or more floating point values.

Example Computer System

Figure 12:
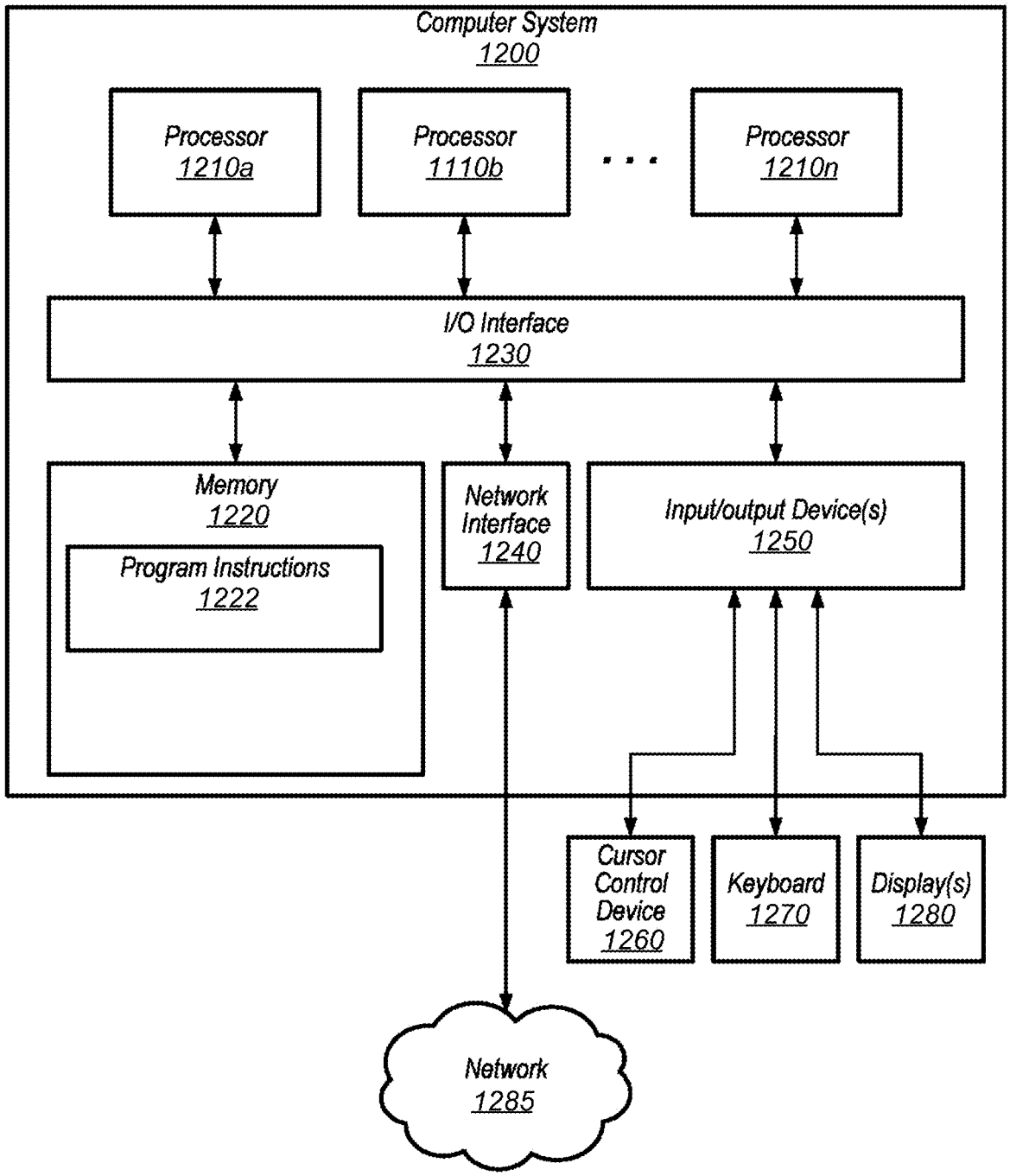
FIG. 12 is a diagram of an example computer system.

FIG. 12 illustrates an example computer system 1200 that may implement the processing device 104 and/or any of the other components described herein, (e.g., any of the components described above with reference to FIGS. 1-11). The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

One or more of the embodiments described herein be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store point cloud compression or point cloud decompression program instructions 1222 and/or sensor data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement an image sensor control application incorporating any of the functionality described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1140.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method comprising:
receiving, by one or more processing devices, encoded image data;
causing, by the one or more processing devices, visual content to be displayed on a display device according to the encoded image data;
receiving, by the one or more processing devices, measurement data comprising one or more measurements of a display of the visual content on the display device, wherein the measurement data is generated using at least one of a spectroradiometer or a colorimeter;
determining, by the one or more processing devices based on the measurement data, one or more first perceptual quantizer (PQ) codes representing the one or more measurements of the display of the visual content on the display device;
determining, by the one or more processing devices based on the encoded image data, one or more second PQ codes;
determining, by the one or more processing devices, one or more metrics indicative of a performance characteristic the display device based on the one or more first PQ codes and the one or more second PQ codes; and
storing, by the one or more processing devices, a data item comprising the one or more metrics.

2. The method of claim 1, wherein determining each of the one or more of the metrics comprises:
determining a difference between one of the first PQ codes and a corresponding one of the second PQ codes.

3. The method of claim 1, wherein determining the one or more metrics comprises determining a plurality of metrics.

4. The method of claim 3, wherein each of the metrics is associated with a respective color and a respective luminance value.

5. The method of claim 4, wherein each of the colors is selected from a group consisting of: red, green, blue, cyan, magenta, and yellow.

6. The method of claim 4, wherein each of the colors is gray.

7. The method of claim 1, wherein the one or more metrics are indicative of a color accuracy of the display device.

8. The method of claim 1, wherein the one or more metrics are indicative of a luminance accuracy of the display device.

9. The method of claim 1, the encoded image data comprises the one or more second PQ codes.

10. The method of claim 1, wherein the one or more second PQ codes are determined based on a transfer function having at least a portion of the encoded image data as an input.

11. The method of claim 1, wherein the one or more first PQ codes are determined based on a transfer function having at least a portion of the measurement data as an input.

12. The method of claim 1, wherein the measurement data comprises one or more luminance values with respect to one or more wavelengths of light.

13. The method of claim 1, wherein the data item comprises at least one of a data table, an array, a structure, a list, a dictionary, or a graph.

14. The method of claim 1, further comprising:
determining one or more threshold values;
comparing the one or more metrics to the one or more threshold values; and
generating one or more notifications to a user based on the comparison.

15. The method of claim 1, further comprising:
causing a graphical user interface (GUI) to be presented to a user, the GUI comprising a visual representation of the one or more metrics.

16. The method of claim 1, wherein the visual representation comprises a graph including at least some of the one more metrics.

17. The method of claim 1, wherein the visual representation comprises a plurality of graphs including at least some of the one more metrics.

18. The method of claim 1, further comprising:
determining one or more modifications to an operation of the display device based the one or more metrics.

19. The method of claim 18, wherein the one or more modifications comprise a modification to a color calibration of the display device.

20. The method of claim 1, wherein the one or more first PQ codes have a first bit depth, wherein the one or more second PQ codes have a second bit depth different from the first bit depth.

21. The method of claim 1, wherein the one or more first PQ codes have a first bit depth, wherein the one or more second PQ codes have a second bit depth, and wherein the first bit depth is equal to the second bit depth.

22. The method of claim 1, wherein the one or more first PQ codes are expressed as one or more floating point values.

23. One or more non-transitory, computer-readable storage media having instructions stored thereon, that when executed by one or more processors, cause the one or more processors to perform operations comprising:
receiving encoded image data;
causing visual content to be displayed on a display device according to the encoded image data;
receiving measurement data comprising one or more measurements of a display of the visual content on the display device, wherein the measurement data is generated using at least one of a spectroradiometer or a colorimeter;
determining, based on the measurement data, one or more first perceptual quantizer (PQ) codes representing the one or more measurements of the display of the visual content on the display device;
determining, based on the encoded image data, one or more second PQ codes;
determining one or more metrics indicative of a performance characteristic the display device based on the one or more first PQ codes and the one or more second PQ codes; and
storing a data item comprising the one or more metrics.

24. A system comprising:
one or more processors; and
memory storing instructions that when executed by the one or more processors, cause the one or more processors to perform operations comprising:
receiving encoded image data;
causing visual content to be displayed on a display device according to the encoded image data;
receiving measurement data comprising one or more measurements of a display of the visual content on the display device, wherein the measurement data is generated using at least one of a spectroradiometer or a colorimeter;
determining, based on the measurement data, one or more first perceptual quantizer (PQ) codes representing the one or more measurements of the display of the visual content on the display device;
determining, based on the encoded image data, one or more second PQ codes;
determining one or more metrics indicative of a performance characteristic the display device based on the one or more first PQ codes and the one or more second PQ codes; and
storing a data item comprising the one or more metrics.

* * * * *

UNITED STATES PATENT AND TRADEMARK OFFICE
CERTIFICATE OF CORRECTION

PATENT NO. : 11,688,361 B2
APPLICATION NO. : 17/313686
DATED : June 27, 2023
INVENTOR(S) : Bjorn S. Hori, Pranav Sodhani and Krasimir D. Kolarov It is certified that error appears in the above-identified patent and that said Letters Patent is hereby corrected as shown below:

On the Title Page

Following Item (57), abstract, replace "performance characteristic the display device" with
-- a performance characteristic of the display device --;

In the Claims

Column 22, Line 23, in Claim 1, replace "performance characteristic the display device" with -- a performance characteristic of the display device --;

Column 23, Line 6, in Claim 16, replace "at least some of the one more metrics" with -- at least some of the one or more metrics --;

Column 23, Line 10, in Claim 17, replace "at least some of the one more metrics" with -- at least some of the one or more metrics --;

Column 23, Line 13, in Claim 18, replace "based the one or more metrics" with -- based on the one or more metrics --;

Column 23, Line 7, in Claim 23, replace "performance characteristic the display device" with -- a performance characteristic of the display device --;

Column 24, Line 32, in Claim 24, replace "performance characteristic the display device" with this
-- a performance characteristic of the display device --.

Signed and Sealed this
Fifteenth Day of October, 2024

Katherine Kelly Vidal
*Director of the United States Patent and Trademark Office*